US012445162B1

(12) United States Patent
Cason

(10) Patent No.: US 12,445,162 B1
(45) Date of Patent: Oct. 14, 2025

(54) ORBITRON WITH INSPECTOR

(71) Applicant: Wesley Lydell Cason, Perrville, MD (US)

(72) Inventor: Wesley Lydell Cason, Perrville, MD (US)

( * ) Notice: Subject to any disclaimer, the term of this patent is extended or adjusted under 35 U.S.C. 154(b) by 0 days.

(21) Appl. No.: 18/945,477

(22) Filed: Nov. 12, 2024

(51) Int. Cl.
*H04B 1/40* (2015.01)
*H04R 1/10* (2006.01)
*H04R 25/00* (2006.01)
*H04R 29/00* (2006.01)

(52) U.S. Cl.
CPC .................................... *H04B 1/40* (2013.01)

(58) Field of Classification Search
None
See application file for complete search history.

(56) References Cited

U.S. PATENT DOCUMENTS 5,587,715 A 12/1996 Lewis
5,760,692 A 6/1998 Block
5,796,365 A 8/1998 Lewis
6,298,306 B1 10/2001 Suarez et al.
6,327,533 B1 12/2001 Chou
6,731,214 B2 5/2004 Kuo
6,873,261 B2 3/2005 Anthony et al.
7,053,822 B2 5/2006 Rickerson, Jr.
7,092,802 B2 8/2006 Baldassa
7,266,209 B1 * 9/2007 House ................ A61N 1/36038 381/326
7,271,717 B1 9/2007 Amos
D618,209 S 6/2010 Andre et al.
7,768,548 B2 8/2010 Silvernail et al.
D624,106 S 9/2010 Cho et al.
7,880,767 B2 2/2011 Chinigo
8,913,989 B2 12/2014 Best et al.
9,602,931 B2 * 3/2017 Parker .................. H04R 25/606
10,091,599 B2 * 10/2018 Lee ........................ H04R 3/005
2007/0015548 A1 1/2007 Flick
2007/0219913 A1 9/2007 Moore (Continued)

FOREIGN PATENT DOCUMENTS

CN 102448164 5/2012
EP 0969435 1/2000
EP 2660789 11/2013

*Primary Examiner* — Pablo N Tran
(74) *Attorney, Agent, or Firm* — Stephen Christopher Swift; Swift & Swift, Attorneys at Law, P.L.L.C.

(57) ABSTRACT

A communication apparatus, comprising: a tiny pin, having a sharp, arrow-shaped end with a spiral groove, suitably dimensioned and configured for insertion, penetration into, and retention in a user's skin; a data receiver; a data transmitter, and a shaft having an inner end attached to the sharp, arrow-shaped end of the tiny pin, and an outer end attached to the data receiver and data transmitter; wherein data are not transmitted by sound waves passing through the user's body. The tiny pin, data receiver and data transmitter are preferably joined in one unit. In an alternative embodiment: a pair of magnets that can be retained on a user's body; a data receiver attached to one of the magnets; and a data transmitter attached to one of the magnets; wherein data are not transmitted by sound waves passing through the user's body. The magnets are preferably made from rare earth elements.

20 Claims, 4 Drawing Sheets

(56) References Cited

U.S. PATENT DOCUMENTS

| | | | | |
|---|---|---|---|---|
| 2008/0139874 | A1* | 6/2008 | Slattery | H04R 25/604 600/25 |
| 2008/0146890 | A1 | 6/2008 | LeBoeuf | |
| 2008/0214142 | A1 | 9/2008 | Morin et al. | |
| 2008/0255406 | A1* | 10/2008 | Ball | H04R 11/02 600/25 |
| 2008/0318622 | A1 | 12/2008 | Jen | |
| 2009/0100865 | A1 | 4/2009 | Guelpen | |
| 2009/0289785 | A1 | 11/2009 | Leonard | |
| 2010/0054501 | A1 | 3/2010 | Choi | |
| 2014/0124389 | A1 | 5/2014 | Borlenghi | |
| 2014/0193011 | A1* | 7/2014 | Parker | H04R 25/606 381/326 |
| 2015/0237596 | A1 | 8/2015 | Carlsson et al. | |
| 2016/0066160 | A1 | 3/2016 | Leclereq et al. | |
| 2019/0090044 | A1* | 3/2019 | Boesen | G10K 11/175 |
| 2019/0261100 | A1* | 8/2019 | Troelsen | H04R 25/60 |
| 2020/0214256 | A1* | 7/2020 | Van Dijk | A01K 11/00 |

* cited by examiner

ORBITRON WITH INSPECTOR

BACKGROUND OF THE INVENTION

1. Field of the Invention

The present invention relates to a "tiny pin" electronic communications device that I call the "Orbitron", combined with a global communications system that I call the "Inspector".

2. Description of the Prior Art

There are prior inventions relating to wireless GPS location and communication systems, but none that are equivalent to the present invention.

U.S. Pat. No. 5,587,715, issued on Dec. 24, 1996, to Peter T. Lewis, discloses a method of tracking a moving object, using satellites. The present invention is distinguishable, because it is wearable in the user's ear.

U.S. Pat. No. 5,760,692, issued on Jun. 2, 1998, to Douglas A. Block, discloses an intraoral tracking device worn on a tooth. The present invention is distinguishable, because it is worn in an ear, rather than on a tooth, and is retained by a pin.

U.S. Pat. No. 5,796,365, issued on Aug. 18, 1998, to Peter T. Lewis, discloses method and apparatus for tracking a moving object, such as an automobile, using a satellite system. The present invention is distinguishable, because it is wearable in the user's ear.

U.S. Pat. No. 6,298,306, issued on Oct. 2, 2001, to Gustavo G. Suarez, Carlos S. Baradello and Salvador Sibecas, discloses a vehicle locating system utilizing global positioning satellites. The present invention is distinguishable, because it aids in the location of missing or abducted children or adults.

U.S. Pat. No. 6,327,533, issued on Dec. 4, 2001, to Yue-Hong Chou, discloses a method and apparatus for continuously locating movable objects. The present invention is distinguishable, because it discloses the use of the Iridium satellite system and fax machines.

U.S. Pat. No. 6,731,214, issued on May 4, 2004, to Chunn-Cherb Kuo, discloses a searching system using global positioning satellites that can be used to find stray people such as children or the aged. The present invention is distinguishable, because it can be worn in the ear.

U.S. Pat. No. 6,873,261, issued on Mar. 29, 2005, to Eric Anthony and Joseph Phillips, discloses an early warning near-real-time security system. The present invention is distinguishable, because it discloses the use of the Iridium satellite system and fax machines.

U.S. Pat. No. 7,053,822, issued on May 30, 2006, to Donald Rickerson, Jr., discloses a wearable satellite tracker that it can be embedded into a floatation device or utility belt. The present invention is distinguishable, because it can be worn in the ear.

U.S. Pat. No. 7,092,802, issued on Aug. 15, 2006, to John A. Baldassa, discloses a vehicle website audio/video communications link. The present invention is distinguishable, because it discloses the use of the Iridium satellite system and fax machines.

U.S. Pat. No. 7,271,717, issued on Sep. 18, 2007, to Vergie M. Amos, discloses a two-way emergency alert system, having a pair of separable devices for use by two persons, which may be worn around the users' wrists or necks. The present invention is distinguishable, because it can be worn in the user's ear.

U.S. Pat. No. 7,768,548, issued on Aug. 3, 2010, to William Bradford Silvernail et al., discloses a mobile digital video recording system. The present invention is distinguishable, because it discloses the use of the Iridium satellite system and fax machines.

U.S. Pat. No. 7,880,767, issued on Feb. 1, 2011, to Andrew Chinigo, discloses a security system for mass transit and mass transportation. The present invention is distinguishable, because it discloses the use of the Iridium satellite system and fax machines.

U.S. Pat. No. 8,913,989, issued on Dec. 16, 2014, to Fiona S. Best et al., discloses a secure transmission over a satellite network, that can use Iridium (FIG. 1; column 28, lines 5-38) and fax machines (FIG. 19; column 5, lines 30-33; column 29, lines 49-67). This patent does not disclose the tiny pin of the present invention.

U.S. Pat. No. 10,091,599, issued on Oct. 2, 2018, to Won-Gi Lee et al., discloses a portable terminal, hearing aid, and method of indicating positions of sound sources in the portable terminal, that has a part that can be worn in the ear. This patent does not disclose the tiny pin of the present invention.

U.S. Design Pat. No. D618,209, issued on Jun. 22, 2010, to Bartley K. Andre et al., discloses a design for an earbud. The present invention is distinguishable, because it is part of a location and communications system.

U.S. Design Pat. No. D624,106, issued on Sep. 21, 2010, to Cheong Dong Cho and Jun Min Park, discloses a design for a motor vehicle surveillance camera. The present invention is distinguishable, because it discloses the use of the Iridium satellite system and fax machines.

U.S. Patent Application Publication No. 2007/0015548, published on Jan. 18, 2007, to Kenneth E. Flick, discloses a vehicle tracker using a vehicle position-determining device and a cellular communications network. The present invention is distinguishable, because it aids in the location of missing or abducted children or adults.

U.S. Patent Application Publication No. 2007/0219913, published on Sep. 20, 2007, to Barrett H. Moore, discloses a subscription based catastrophe-triggered rescue services facilitation method and apparatus. The present invention is distinguishable, because it discloses the use of the Iridium satellite system and fax machines.

U.S. Patent Application Publication No. 2008/0146890, published on Jun. 19, 2008, to Steven Francis LeBoeuf, Jesse Berkley Tucker and Michael Edward Aumer, discloses a telemetric apparatus for health and environmental monitoring. The present invention is distinguishable, because it is retained in the user's ear with the aid of a tiny pin.

U.S. Patent Application Publication No. 2008/0214142, published on Sep. 4, 2008, to Michelle Stephanie Morin and Steven Edward Morin, discloses an emergency alerting system. The present invention is distinguishable, because it can be worn in the user's ear.

U.S. Patent Application Publication No. 2008/0318622, published on Dec. 25, 2008, to Tsui-Yun Jen, discloses a handheld intelligent mobile and fixed wireless device. The present invention is distinguishable, because it discloses the use of the Iridium satellite system and fax machines.

U.S. Patent Application Publication No. 2009/0100865, published on Apr. 23, 2009, to Laura Van Guelpen, discloses an earring assembly. The present invention is distinguishable, because it discloses means for communication.

U.S. Patent Application Publication No. 2009/0289785, published on Nov. 26, 2009, to Ellen Leonard, discloses a GPS tracking system for individuals, pets or possessions. It may be attached to body parts by an adhesive patch or a strap. The present invention is distinguishable, because it fits inside the user's ear, without requiring a patch or strap.

U.S. Patent Application Publication No. 2010/0054501, published on Mar. 4, 2010, to Seong Sik Choi, discloses a face plate, vibration speaker having a face plate, and portable terminal including them. The present invention is distinguishable, because it is retained with the aid of a tiny pin.

U.S. Patent Application Publication No. 2014/0124389, published on May 8, 2014, to Malcolm Larry Borlenghi, discloses an apparatus for housing a GPS device for locating children, with a band that can be locked around a child's wrist or ankle. The present invention is distinguishable, because it can be worn in the ear.

U.S. Patent Application Publication No. 2014/0193011, published on Jul. 10, 2014, to John Parker, discloses a bone conduction device, that transmits sound through bones. The present invention is distinguishable, because it relies only on transmittal of sound through the air.

U.S. Patent Application Publication No. 2015/0237596, published on Aug. 20, 2015, to Richard Carlsson, Tomas Goldbeck-Löwe and Sky Zhao, discloses automatic detection of device type for filtering of data. The present invention is distinguishable, because it discloses the use of the Iridium satellite system and fax machines.

U.S. Patent Application Publication No. 2016/0066160, published on Mar. 3, 2016, to Maxime Leclereq, Ionannis Spyropoulos and Nishant Kumar, discloses a method and system for global navigation satellite system configuration of wireless communication applications. The present invention is distinguishable, because it discloses the use of the Iridium satellite system and fax machines.

U.S. Patent Application Publication No. 2019/0090044, published on Mar. 21, 2019, to Peter Vincent Boesen, discloses an earpiece with user-adjustable white noise. The present invention is distinguishable because it is retained in the ear with the aid of a tiny pin.

U.S. Patent Application Publication No. 2019/0261100, published on Aug. 22, 2019, to Jens Troelsen and Poul Henricksen, discloses a hearing aid device having an antenna. The present invention is distinguishable because it is retained in the ear with the aid of a tiny pin and/or by rare earth magnets.

U.S. Patent Application Publication No. 2020/0214256, published on Jul. 9, 2020, to Jeroen Martin Van Dijk and Roxie Sabri Romero Muller, discloses a tag for attachment to an animal. The present invention is distinguishable because it has a pin with a spiral groove and/or rare earth magnets.

European Patent Application No. 0 969 435, published on Jan. 5, 2000, to Raj Kumar Dhameja and Martin McQueenie, discloses a personal tracking system predominantly for children, to be worn on the wrist or ankle. The present invention is distinguishable, because it can be worn in the ear.

Chinese Patent No. 102448164, published on May 9, 2012, discloses a video tracking method and system on basis of positioning of sensor network. The present invention is distinguishable, because it discloses the use of the Iridium satellite system and fax machines.

European Patent Application No. 2 660 789, published on Nov. 6, 2013, to Dudley K. Fetzer and Thomas F. Doyle, discloses a wireless tracking device, that can be attached to an article of clothing or fabric, or in a bracelet, anklet or shoe. The present invention is distinguishable, because it can be worn in an ear.

None of the above inventions and patents, taken either singly or in combination, is seen to describe the instant invention as claimed.

SUMMARY OF THE INVENTION

The present invention is a "tiny pin" communication device, that can be inserted into and retained in the user's skin, preferably on the ear lobe, and can interact with computers, cellular telephones, satellites and other electronic devices, as part of a global communications system. Alternatively, the communications device can be retained on the user's ear lobe, or other body part, with the use of magnets, preferably, rare earth magnets.

Accordingly, it is a principal object of the invention to provide a communications device that can be retained in the user's ear.

It is another object of the invention to provide a communications device that can be retained on the user's body.

It is a further object of the invention to provide a communications device that can interact with other electronic devices.

Still another object of the invention is to provide a communications device that can interact with a global communications system.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
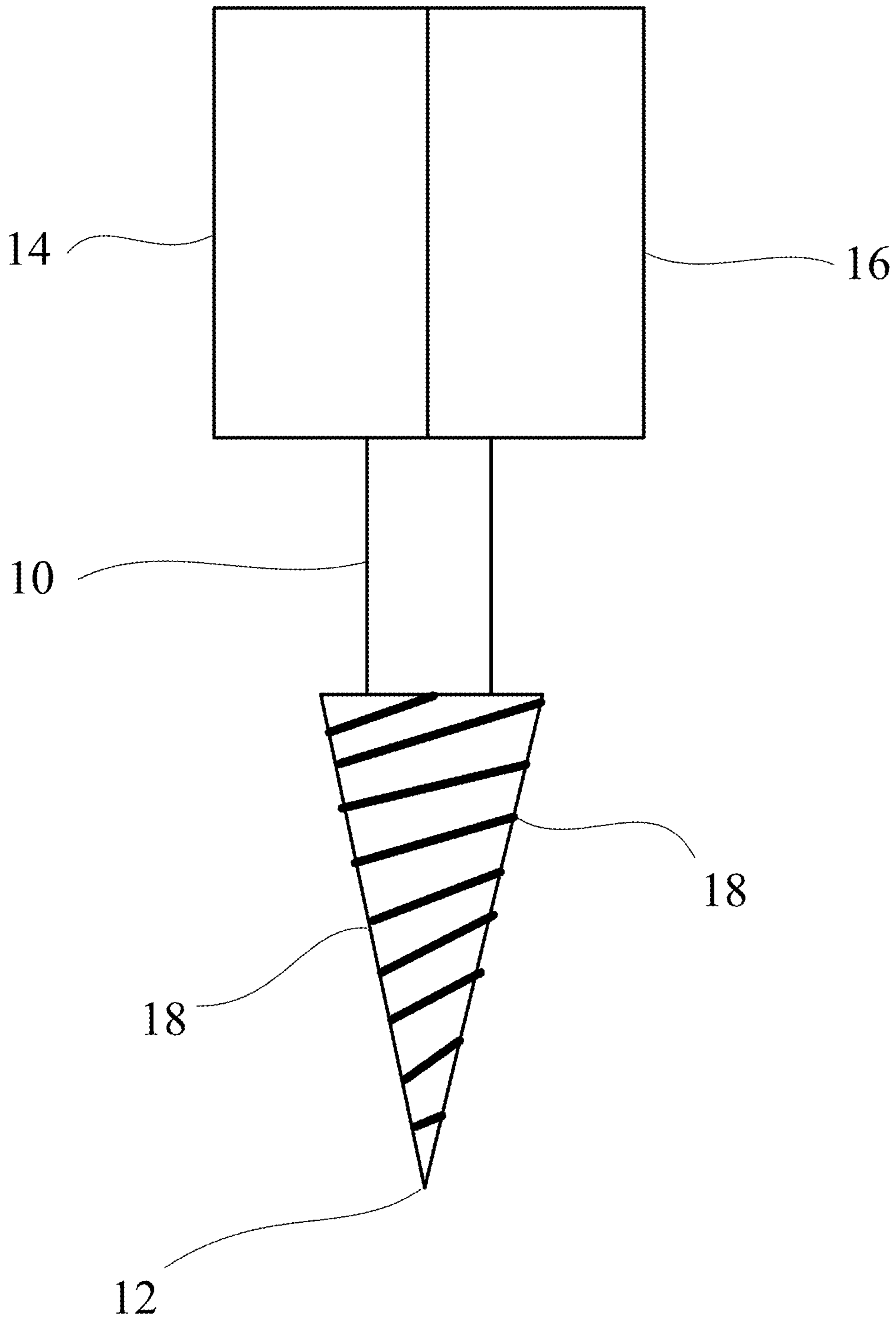
FIG. 1 is front elevational view of the "tiny pin" connector of the first preferred embodiment of the present invention, with a spiral groove in the pin.
Figure 2:
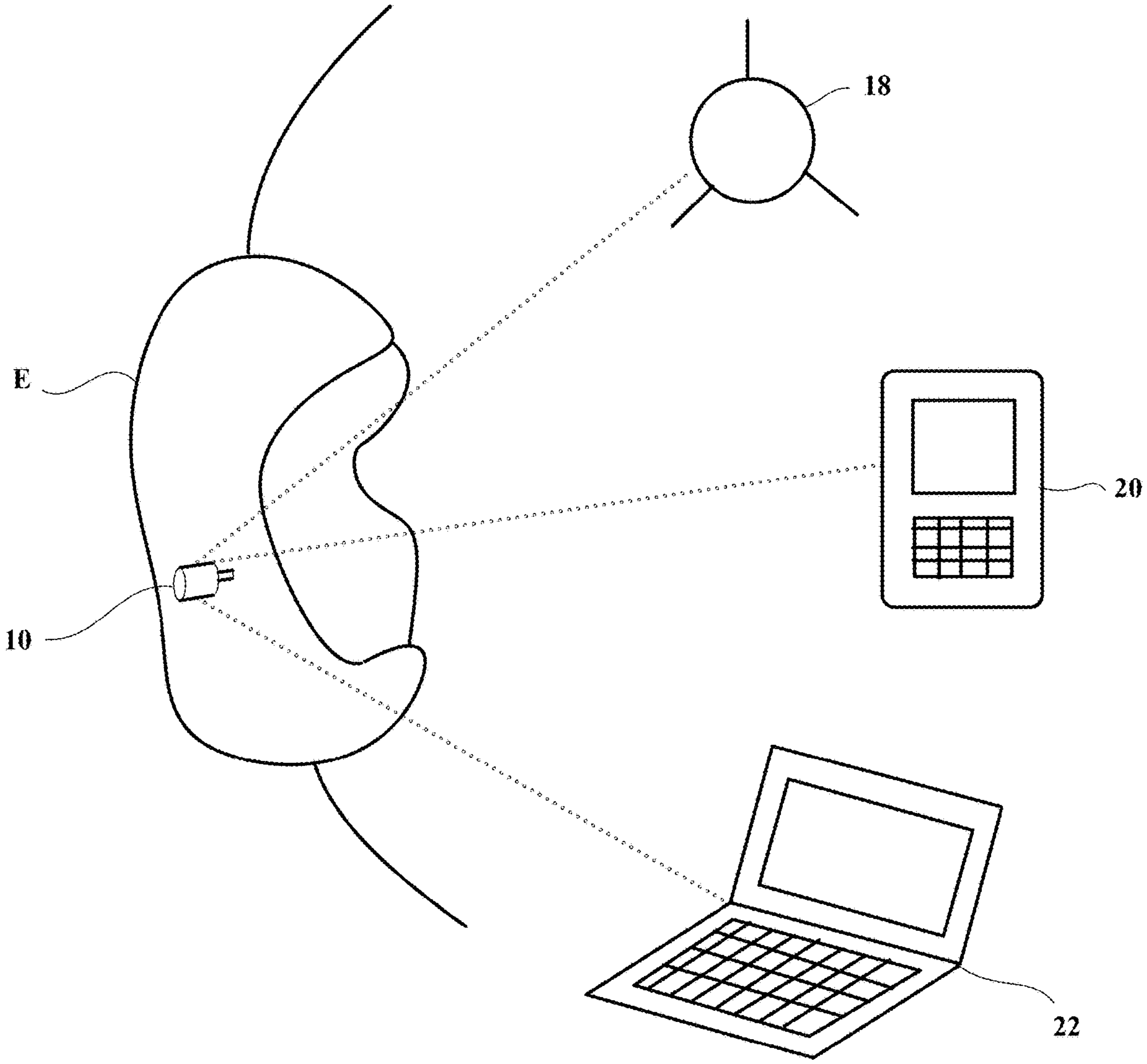
FIG. 2 is a schematic view of the first preferred embodiment of the present invention.

The first preferred embodiment of present invention is a "tiny pin" connector, shown in FIG. 1, that operates with a communications system, shown in FIG. 2.

The "tiny pin" connector 10 includes a sharp end 12 that can be inserted into and retained in the user's skin, preferably on the ear lobe E. It includes a receiver 14 and a transmitter 16, as shown in FIG. 1. Preferably, the tiny pin, receiver and transmitter are integrally joined into one unit. The "tiny pin" has a spiral groove 18, which makes it both easier to insert into the user's skin, and harder to accidently be pulled out of the user's skin.

FIG. 2 shows the "tiny pin" communicating with other electronic devices, including a satellite 18, a cellular telephone 20, and a computer 22. While wired connections are within the scope of the invention, preferably it communicates wirelessly. It preferably communicates with electromagnetic waves, such as radio or infrared waves, but could also communicate by sound waves passing through the air (including ultrasonic waves that have too high a frequency to be heard by human ears).

Figure 3:
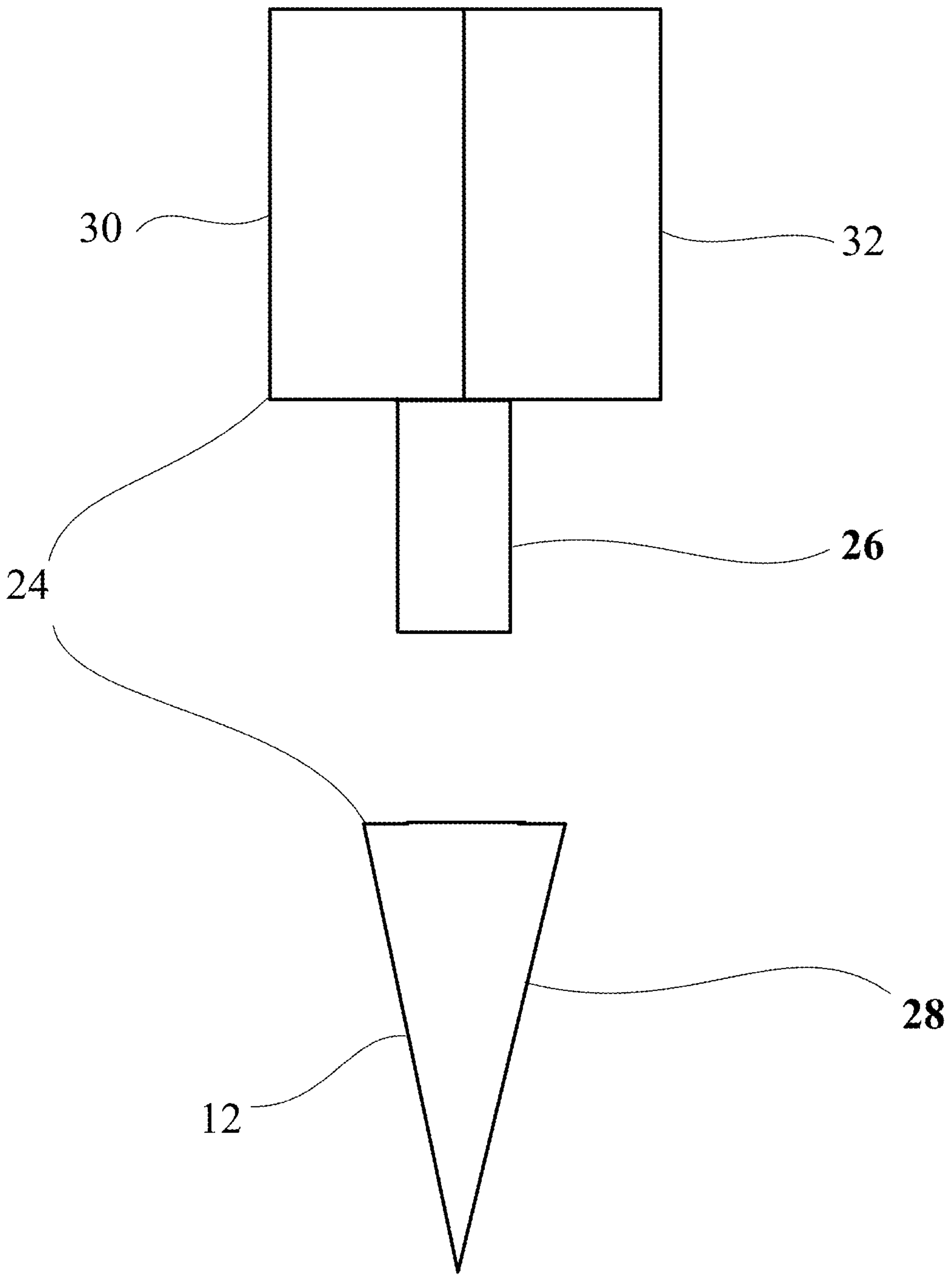
FIG. 3 is front elevational view of the connector of the second preferred embodiment of the present invention, which is retained on the user by a pair of magnets.
Figure 4:
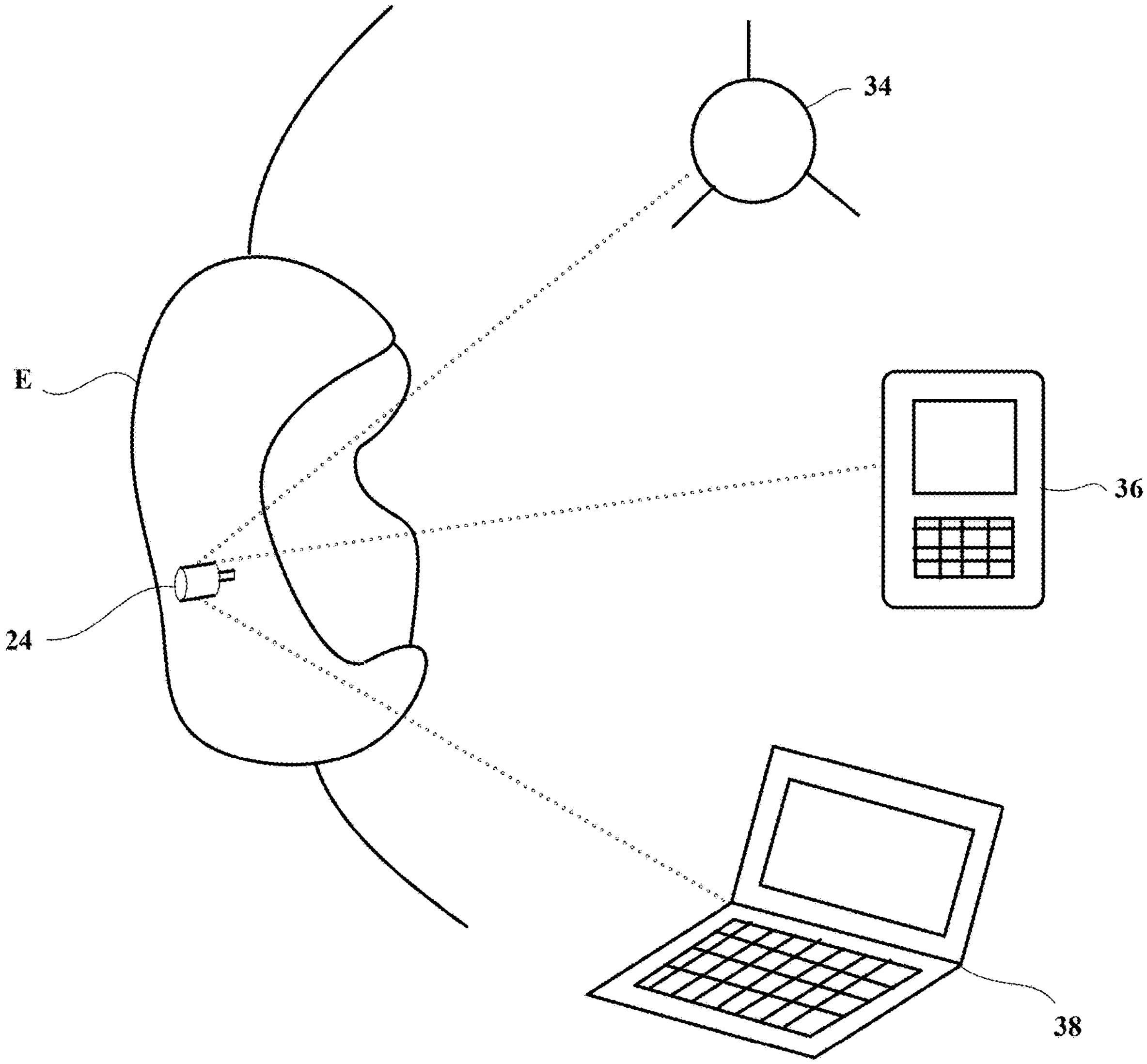
FIG. 4 is a schematic view of the second preferred embodiment of the present invention.

The second preferred embodiment of present invention is a connector that has a pair of magnets, shown in FIG. 3, that operates with a communications system, shown in FIG. 4.

The "magnetic" connector 24 includes a first magnet 26 that engages a second magnet 28. The magnets should preferably be made of rare earth elements or other elements that can be strongly magnetized. The north pole of one of the magnets should be near the south pole of the other magnet, so that they are magnetically attracted. They need not be inserted into and retained in the user's skin, but can be placed on opposites sides of a user's body part, such as an ear lobe E. They include a receiver 30 and a transmitter 32, as shown in FIG. 3.

FIG. 4 shows the magnetic connector communicating with other electronic devices, including a satellite 34, a cellular telephone 36, and a computer 38. While wired connections are within the scope of the invention, preferably it communicates wirelessly. It preferably communicates with electromagnetic waves, such as radio or infrared waves, but could also communicate by sound waves passing through the air (including ultrasonic waves that have too high a frequency to be heard by human ears).

This system can work from any army Humvee or other military vehicle, ship, or jet. It works by satellites used in unison with each other by a laser optic link and RF transmission which is computerized into its own language. This information is linked to a net (of any composition) for remote viewing and by scan to visual capability on a viewing screen/keyboard component, so that users may see each other on and may see one another from their screens. It has full color day and night from the satellites and scaling to view capability and is also portable adapter allowing you to move the remote viewing system to any compatible site providing complete maneuverability. It also has an integral satellite navigational component for ships, planes, boats, and cars and all military vehicles from battlefield to police cruisers. You cannot escape the Orbitron! It can also hear as a listening device: for instance, you can pick-up the talk of criminals going to commit a crime. Any information you wish to add can be transmitted by satellite link-ups, across the United States of America and around the world. From a private jet to a soldier in the field, the Orbitron can be a valuable friend. The system also has a real time camera in screen to see back and forth to screens. With color, it is able to see in night applications and can be seen on a general television screen as well as home computers, so that people may see each other from screen to screen on computers. You can also talk to the computer, and could display in print on the screen what you say. It can be used by military and civilian police to detect for crimes in progress. All an officer has to do is see or talk to the screen and the crime and the transmission will be seen. Back at the police station or in other cruisers, it may be seen in more than one police cruiser as they are going to the crime scene; also type information by voice or touch pad prompt and transmit it! It can also "hear." For instance, say you can hear criminals going to commit a crime in a city.

You can see the jets flying anywhere, and ships, tanks, and submarines, and you would see everything by this system, even indoor or while traveling by the Orbitron. It may be used for an end shot for looking into space. This may be used in space travel also for looking and searching out new planets just like Earth. It will be able to see that far into space using the Orbitron telemetric system. And it would see countless centers in time to bring back the sharp pictures to the screens on Earth and other planets that we go to in time and space. This system is effective for everything!

It can be used for real time targeting at sea just for the Navy or Coast Guard. It could also be used by the CIA by using probes for top security missions. The agent would hear his chief from this system by using the Orbitron hook-up system. The "tiny pin" probe system with Orbitron may work just like a phone system with link-ups. By probes in your ears you would have operators for dialing into this system. For operators you talk out or just keep your mouth closed. This is a hold and complete system. These systems are cheaper to make then telescopes. The system used in scopes in the military M-16 and inside tanks and submarines. It will make the scopes much sharper then they use today for distances on screen when the Army fires at a target. The screen in the Pentagon should be eight feet by six feet. Screens in the ships and submarines, jets, tanks and all military vehicles will be smaller. Space ships use it to can see a long way in space.

This invention has an aspect called the "Inspector". It is a real-time, two-way satellite communication system. It may optimally be used in conjunction with the Iridium satellite constellation, with which it could be fully integrated, to provide the ability to view any situation, or anyone's location, anywhere in the world. It includes functional components such as a satellite receiver/transmitter, a microprocessor-based control unit, and a multi-function printer-fax-copier machine in a handheld equipment package. It can receive data via satellite and print or fax data from a display screen. It can aid in the location of missing or abducted children or adults.

It is to be understood that the present invention is not limited to the sole embodiment described above, but encompasses any and all embodiments within the scope of the following claims.

The invention claimed is:

1. A communication apparatus, comprising:

a tiny pin, having a sharp, arrow-shaped end with a spiral groove, suitably dimensioned and configured for insertion, penetration into, and retention in a user's skin;

a data receiver;

a data transmitter, and a shaft having an inner end attached to the sharp, arrow-shaped end of the tiny pin, and an outer end attached to the data receiver and data transmitter;

wherein data are not transmitted by sound waves passing through the user's body.

2. The communication apparatus according to claim 1, wherein:

the tiny pin, data receiver and data transmitter are joined in one unit.

3. The communication apparatus according to claim 2, wherein:

data are received and transmitted without the use of wires.

4. The communication apparatus according to claim 3, wherein:

data are received and transmitted using waves.

5. The communication apparatus according to claim 4, wherein:

data are received and transmitted by sound passing through the air.

6. The communication apparatus according to claim 4, wherein:

data are received and transmitted with computers.

7. The communication apparatus according to claim 4, wherein:

data are received and transmitted with telephones.

8. The communication apparatus according to claim 4, wherein:

data are received and transmitted by electromagnetic radiation.

9. The communication apparatus according to claim 8, wherein:

data are received and transmitted by radio waves.

10. The communication apparatus according to claim 9, wherein:

data are received and transmitted with satellites.

11. A communication apparatus, comprising:

a tiny pin with a magnetized end, a magnetized attachment member, by which the tiny pin can be retained on a user's body;

a data receiver;

a data transmitter, and a shaft having an inner end attached to the sharp, arrow-shaped end of the tiny pin, and an outer end attached to the data receiver and data transmitter;

wherein data are not transmitted by sound waves passing through the user's body.

12. The communication apparatus according to claim 11, wherein:

The magnetized end of the tiny pin and the magnetized attachment member are made from rare earth elements.

13. The communication apparatus according to claim 12, wherein:

data are received and transmitted without the use of wires.

14. The communication apparatus according to claim 13, wherein:

data are received and transmitted using waves.

15. The communication apparatus according to claim 14, wherein:

data are received and transmitted by sound passing through the air.

16. The communication apparatus according to claim 14, wherein:

data are received and transmitted with computers.

17. The communication apparatus according to claim 14, wherein:

data are received and transmitted with telephones.

18. The communication apparatus according to claim 14, wherein:

data are received and transmitted by electromagnetic radiation.

19. The communication apparatus according to claim 18, wherein:

data are received and transmitted by radio waves.

20. The communication apparatus according to claim 19, wherein:

data are received and transmitted with satellites.

* * * * *